T. HENNESSY.
Valve for Water-Closets, &c.
No. 221,816.                   Patented Nov. 18, 1879.
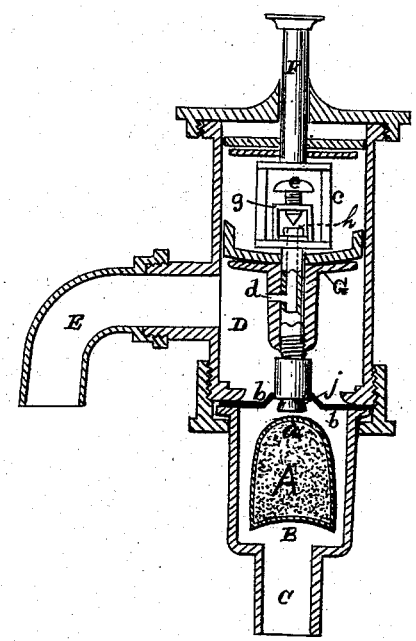
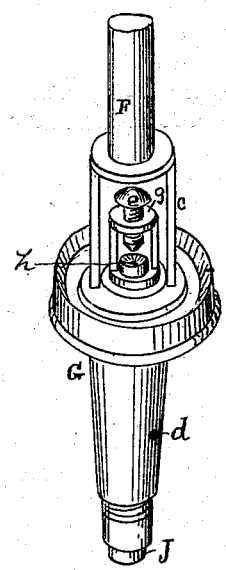
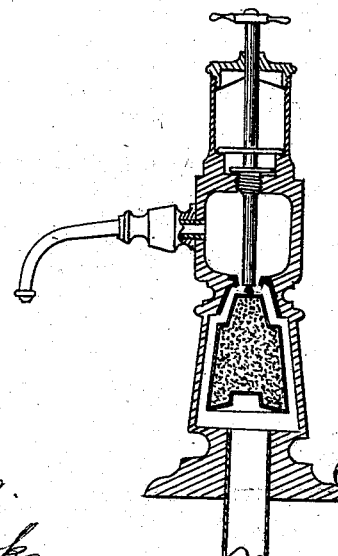
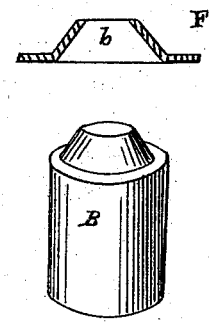
Witnesses
Geo. H. Strong.
Frank N. Brooks.
Inventor
Thomas Hennessy
By Dewey & Co.
Atty

UNITED STATES PATENT OFFICE.

THOMAS HENNESSY, OF OAKLAND, CALIFORNIA.

IMPROVEMENT IN VALVES FOR WATER-CLOSETS, &c.

Specification forming part of Letters Patent No. 221,816, dated November 18, 1879; application filed April 21, 1879.

*To all whom it may concern:*

Be it known that I, THOMAS HENNESSY, of Oakland, county of Alameda, and State of California, have invented an Improvement in Valves for Water-Closets, Basins, and other purposes; and I hereby declare the following to be a full, clear, and exact description thereof.

My invention relates to certain improvements in valves for water-closets, basins, and other purposes; and it consists, first, in a novel construction of the valve, whereby it may be made extremely light, so as to act quickly, and at the same time it will resist the blows caused by the force of the water, which otherwise will indent and bruise it so as to render it useless.

Figure 1 is a section of my device. Fig. 2 is a modification. Fig. 3 is a view of the flanged piece with its attachments for regulating the flow. Fig. 4 is a detached view of the valve and seat.

Letters Patent were issued to myself and Michael H. Dorgan, July 2, 1878, numbered 205,549, for a hollow float-valve with concaved lower surface, dome-shaped top, and a stem, the pressure of water balancing the valve, so that when pushed from its seat by a screw or lever by means of the stem the water would flow in, and when the screw or lever was raised the pressure of water below would lift the valve to its seat and shut off the water.

I find, in practice, that the pressure of water, acting on the hollow valve in its chamber, has the effect of battering it out of shape, so that it will not continue to fit in its seat when closed, and leakage thereby occurs. Moreover, the stem is apt to rattle as the valve is moved, and is otherwise objectionable.

To remedy these defects I have constructed a valve, A, which may have a concave lower surface and a rounded or conical top, $a$, said top fitting into a correspondingly-shaped seat, $b$. This valve is made of sheet brass or copper, and is filled with compressed cork or similar light substance, so as to float on the water, while it is at the same time solid enough to withstand any shock caused by the pressure of water without being battered out of shape.

The valve moves vertically in a valve-chamber, B, connected with a water-supply pipe, C. It has no stem, as float-valves usually have, but is so fitted in the valve-chamber as to move vertically in it freely, while at the same time there is sufficient space at the sides past which the water may flow. When relieved of the downward pressure of a spindle or lever, as hereinafter described, it rises to its seat by the pressure of water, and, as its upper end corresponds in shape to the seat, forms a guide, and a tight joint is made.

The chamber D, through which the water flows to the closet or basin, forms part of or is attached to the valve-chamber B, and has a discharge-pipe, E, which leads into the basin, in the usual manner. Through a stuffing-box in the top of the chamber D passes a spindle, F, the lower end of which is fastened to a yoke, $c$, which, in turn, is secured to the upper end of a hollow flanged piece, G. On the lower end of this hollow flanged piece is a small rod or spindle, into which is fitted a piece of rubber, $j$, which impinges on the top of the valve to force said valve down from its seat. On the upper part of the piece G a packing is placed on the flange to prevent leakage. This piece has formed on one side of it a small hole, $d$, leading up through it to the upper side of the flange at the center. Under the yoke and in the center of the flange is placed a screw, $e$, having a conical lower end, and moving in a threaded bearing, $g$, raised above the flange, as shown, the opening $h$ under it leading to the hollow piece and thus communicating with the hole $d$.

When the spindle F is forced down by connections of yoke, flanged piece, and rubber-tipped rod, it forces the valve A from its seat, and allows the water to flow upward from the supply-pipe into the upper chamber, D, and out of the discharge-pipe. It also passes through the hollow piece G by means of the holes $d$ $h$, and fills the chamber D above the flange G. On the spindle being released, the pressure of water below on the valve begins to force it up to its seat, and gradually raises the rubber-tipped rod, yoke, and spindle.

The chamber D above the flanges, however, being filled with water, the valve cannot jump to its seat quickly, as the flange presses against the water above it, and this water must flow down and out before the flanged piece can be pushed up by the rising valve.

The pressure of water on the valve, by pushing upward on the flanged piece, forces the water in the upper part of the chamber D back again slowly through the hole $h$, through the hollow piece G, and out of the hole $d$, whence it may pass out of the discharge-pipe. By this means, although the valve opens quickly, it closes slowly, and a wash is given to the closet-bowl, as water continues to run in the supply-pipe until the valve fits closely to its seat.

By enlarging or diminishing the size of the orifice $h$ through the hollow piece by means of the conical pointed screw $e$, the amount of wash is regulated, as is the speed of closing the valve. When the opening $b$ is perfectly clear, by the screw being screwed up away from it, the water above the flanged piece in the chamber D will flow out quickly, as the rising valve lifts the flanged piece and spindle, and only a slight wash will be given. To effect a longer flow and greater wash, the screw is screwed down so that the size of the orifice $h$ is diminished. The water above therefore passes out to the discharge-valve more slowly, and the valve is longer coming to its seat, so a greater flow is insured.

This arrangement of valve, chambers, and regulating-screw is specially adapted for water-closet bowls, but may be used for other purposes as well. Greater or less flow is secured by regulating the size of the opening by the screw, as described. The valve itself, being filled with cork, cannot be battered, and the rubber-tipped rod which forces the valve down answers every purpose of a valve-stem without being connected direct to the valve. As the rubber comes down on top of the valve when the spindle is forced down, no move or jar is felt, nor is there any danger of injuring the valve.

Having thus described my invention, what I claim as new, and desire to secure by Letters Patent, is—

1. The valve A, formed of thin metal and filled with compressed cork or similar substance to prevent battering, and having a rounded or conical top, $a$, fitting a correspondingly-shaped seat, $b$, when arranged to float in a chamber and be lifted to its seat by a pressure of water in the supply-pipe, substantially as and for the purpose herein described.

2. The metal float-valve A, having its interior filled with cork to render it solid, and provided with a rounded or conical top, $a$, to fit a correspondingly-shaped seat, $b$, moving vertically in a valve-chamber connected with the water-supply pipe, in combination with a rubber-tipped rod, $j$, suitably connected with an operating-spindle, F, whereby said valve is operated, substantially as and for the purpose herein described.

3. The stemless cork-filled float-valve A, with its conical or rounded top $a$, fitting in a correspondingly-shaped seat, $b$, and moving vertically in the chamber B, connected with the water-supply pipe C, in combination with the hollow flanged piece G, having the perforations $d$ $h$, rubber-tipped rod $j$, yoke $c$, regulating-screw $e$, and spindle F, moving vertically in the chamber D, having a discharge-pipe, E, whereby the valve is operated and flow or wash of water is controlled, substantially as and for the purpose herein described.

In witness whereof I have hereunto set my hand.

THOMAS HENNESSY.

Witnesses:
 FRANK A. BROOKS,
 S. H. NOURSE.